April 23, 1940.  J. V. SCHAFER  2,198,231
FISHING REEL
Filed April 13, 1938    5 Sheets-Sheet 1
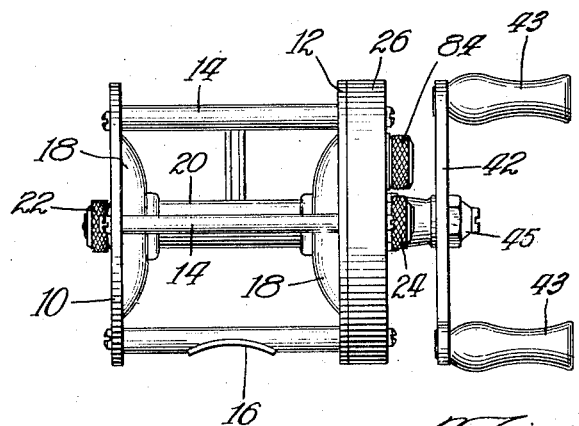
Fig. 1
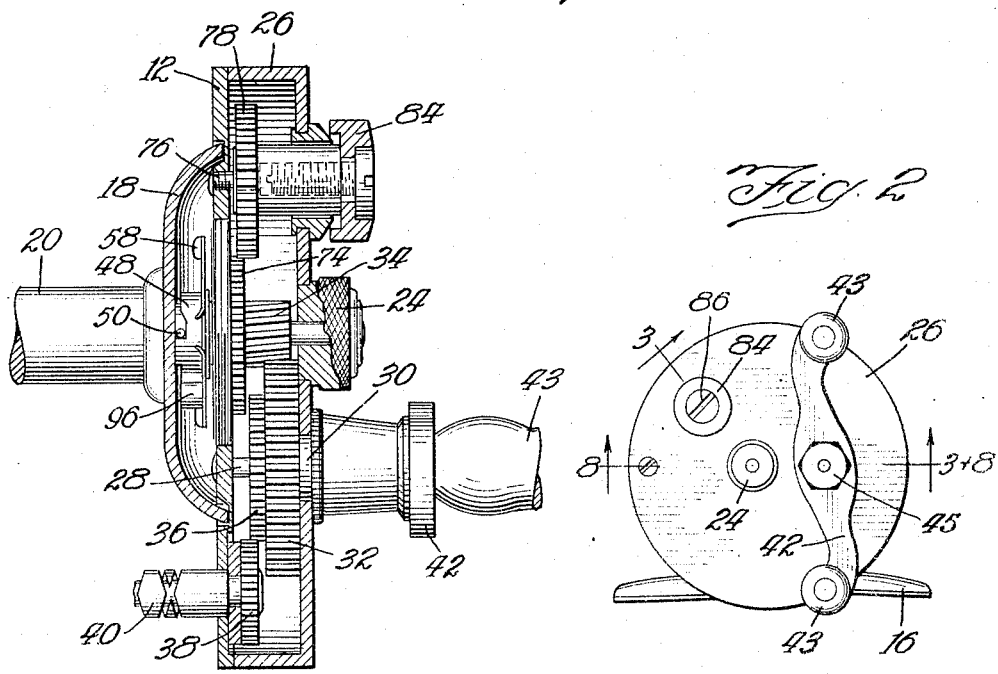
Fig. 2
Fig. 3
Inventor:
John V. Schafer
By Freeman, Sweet, Albrecht & Weidman
Attys.

April 23, 1940. J. V. SCHAFER 2,198,231
FISHING REEL
Filed April 13, 1938 5 Sheets-Sheet 2
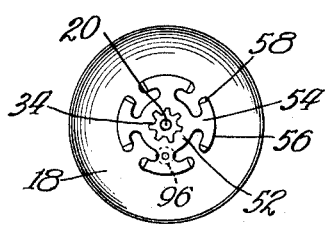
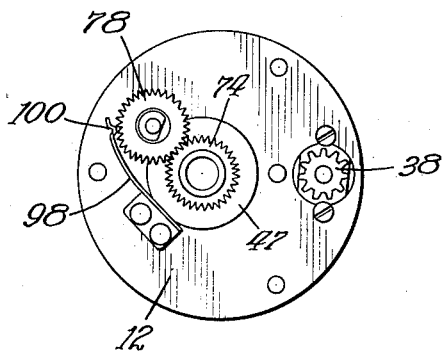
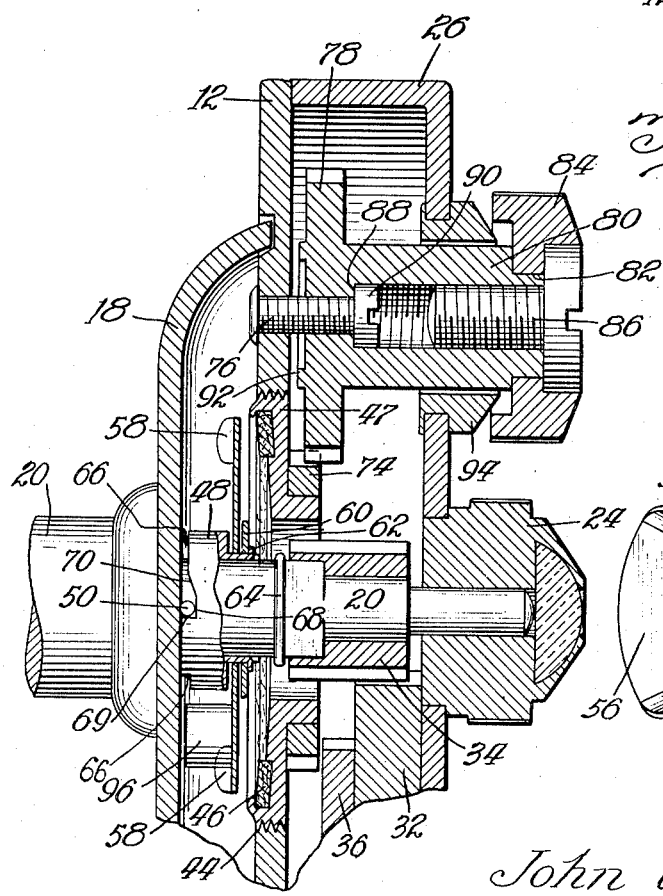
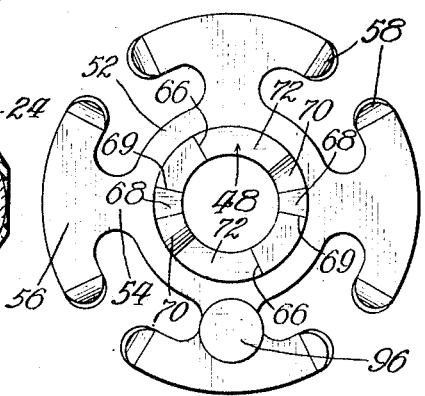
Inventor:
John V. Schafer
By Freeman, Sweet, Albrecht & Weidman
Attys.

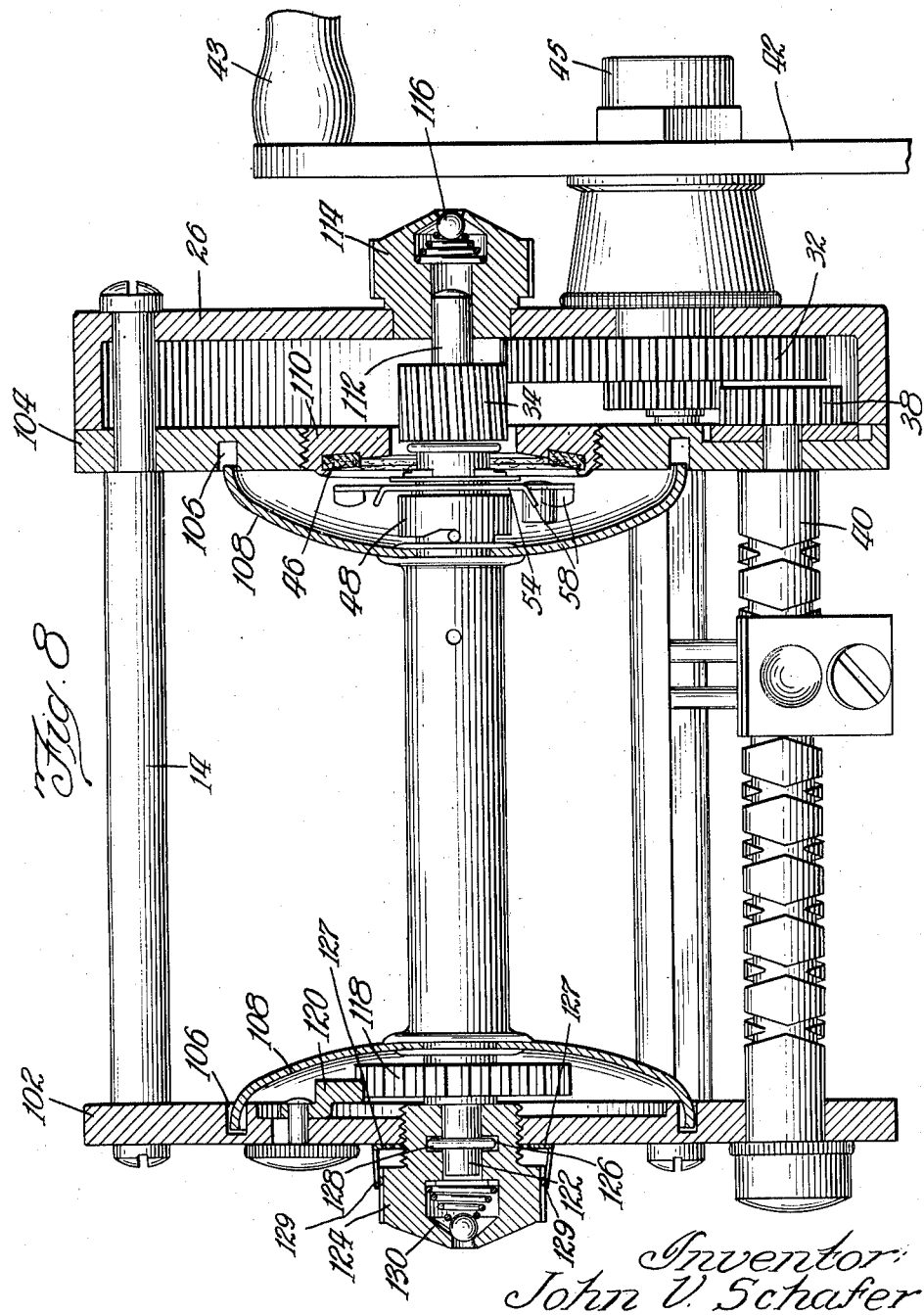

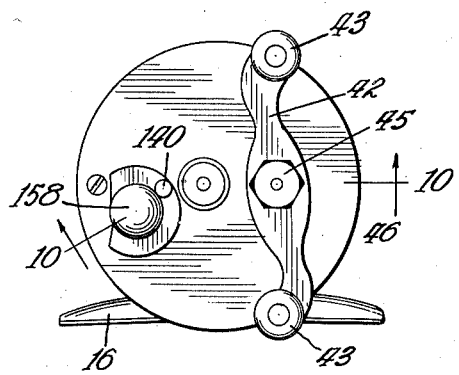
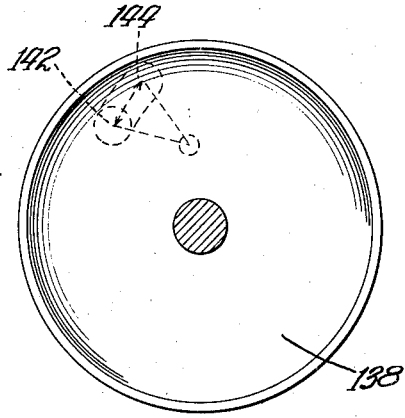
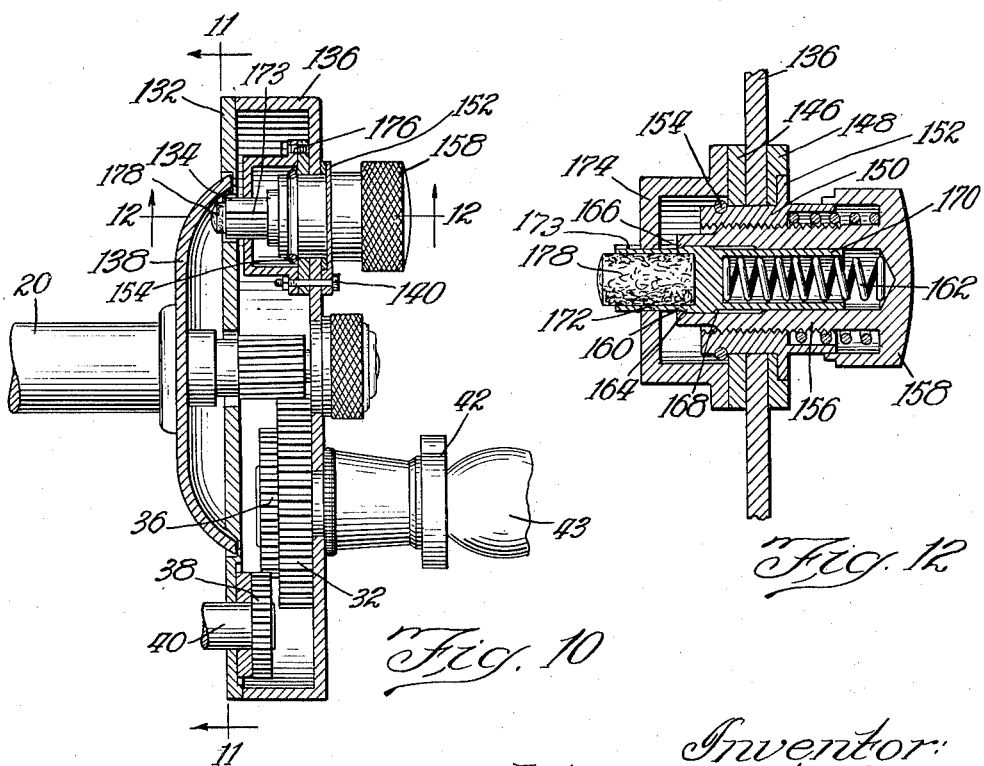

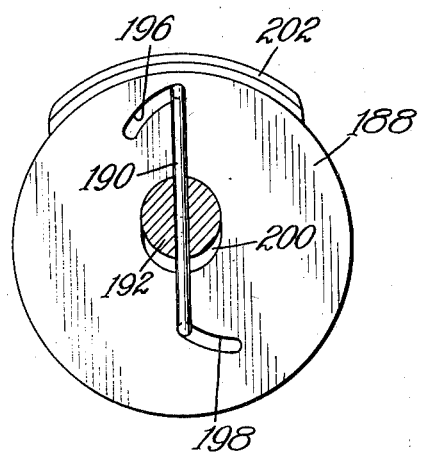
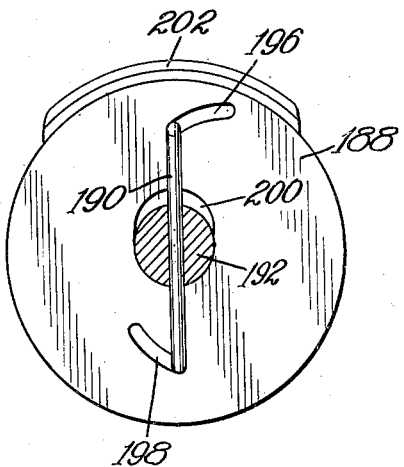
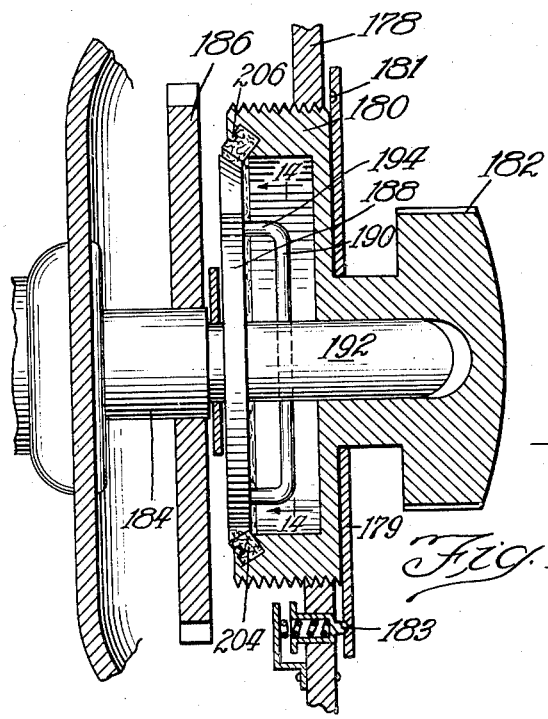

Patented Apr. 23, 1940

2,198,231

UNITED STATES PATENT OFFICE 2,198,231

FISHING REEL

John V. Schafer, Bronson, Mich., assignor to Bronson Reel Company, Bronson, Mich., a corporation of Michigan Application April 13, 1938, Serial No. 201,697

20 Claims. (Cl. 242—84.5)

My invention relates to fishing reels and includes among its objects and advantages an improvement in spool control particularly designed to facilitate casting without backlash.

In the accompanying drawings:

Figure 1 is a side elevation of a complete reel including an embodiment of the invention;

Figure 2 is a head end elevation of the reel of Figure 1;

Figure 3 is a section on line 3—3 of Figure 2 with some of the parts in elevation;

Figure 4 is an end view of the spool and inertia member carried thereby;

Figure 5 is a head end view of the reel with the head cap and spool removed;

Figure 6 is a partial detail section as on line 3—3 of Figure 2 on an enlarged scale;

Figure 7 is an enlarged view of the inertia member;

Figure 8 is a section as on line 3—3 of Figure 2 illustrating a different means of adjustment;

Figure 9 is an end view of a reel embodying a different type of automatically variable drag;

Figure 10 is a section on line 10—10 of Figure 9;

Figure 11 is an end view of the spool as on line 11—11 of Figure 10;

Figure 12 is a section on line 12—12 of Figure 10;

Figure 13 is a section along the axis of a reel spool showing another form of inertia actuated drag;

Figure 14 is a view as on line 14—14 of Figure 13 showing the parts in the position they occupy when the line is reeled in;

Figure 15 is a view of the same parts in the positions occupied when the line is running out; and Figure 16 is a diagram indicating the preferred range of adjustment.

In the embodiment of the invention selected for illustration in Figures 1 to 7, inclusive, the reel comprises the usual frame made up of a tail plate 10 and head plate 12 interconnected by pillars 14, certain of which carry the rod mounting plate 16. The spool has the usual end bells 18 and shaft 20. At the left end of the reel the shaft 20 turns in the bearing 22 in the tail plate, and at the right end the shaft turns in the bearing 24 carried by the head cap 26. The head plate 12 carries the usual stud 28 for the pivotal support of the tubular drive shaft 30 carrying the large gear 32 which meshes with the spool pinion 34 to drive the spool, and the smaller gear 36 which meshes with the gear 38 on the level wind shaft 40 for driving the level wind attachment. The tubular shaft 30 is driven by the usual crank 42 provided with duplicate handles 43 at its ends and fastened in place by suitable fastening means at 45. Adjustably mounted in the head plate 12, is the brake shoe 47. In the embodiment illustrated adjustment is by means of screw threads 44 which, in a fresh water casting reel of average size may advantageously be of a pitch of 48 threads to the inch. The threads 44 are lefthanded. The brake shoe 47 carries the leather facing 46. The active portion of this facing is a hollow cone, the surface of which makes an angle of four degrees with the base of the cone. On the shaft 20 I mount an inertia member adapted to fly over and rub against the facing 46 when the spool begins to rotate in the direction paying out the line, and to be held in continued frictional engagement as long as the line continues to move out. This member comprises the sleeve 48 having cam surfaces at its left end to cooperate with the pin 50 fixed on the spool shaft. At its right end the diameter of the sleeve 48 is reduced to form a shoulder and the reduced portion has non-circular engagement with the hub 52 of a spider comprising four radial arms 54 of the general shape of the letter T with the crosspiece of the T at 56 forming a contact member for braking engagement with the facing 46. The ends of the contact members 56 are turned up at 58 to eliminate any possibility of scoring the facing 46. As clearly indicated in Figure 6, the retaining washer 60 is fastened in place by lugs 62, and leaves axial clearance for the hub 52 about equal to the thickness of the hub. This freedom permits the hub to adjust itself, when the contact members 56 are carrying load, and equalize the load on the different members. The entire assembly is limited in movement to the right by a retaining ring 64.

The cam means at the left end of the sleeve comprises spaced shoulders at 69 and 66 adapted to abut the pin 50 and limit the rotation of the inertia member. Between the abutments there is a low flat portion at 68 which lies adjacent the pin when the line is being reeled in; an inclined surface at 70; and a high flat surface at 72. It will be apparent that movement of the spool in the direction of paying out line will move the pin 50 from the position of Figure 6 over into contact with the high flat surface 72, in which position the contact members 56 are pressed against the facing 46. Then, after the pin 50 has reached the shoulder 66, the inertia member and spool continue to rotate together under the retarding action of friction depending on the positioning of the facing 46.

I have illustrated suitable adjustment means for the facing 46. Referring to Figure 6, the shoe 47 carries a gear 74. The stud 76 is integrally united with the head plate 12 and has threaded engagement with the hub of the adjusting gear 78. The gear 78 also has a drive sleeve 80 having a non-circular upper end 82 on which is mounted a manual actuating means in the nature of an annular knurled ring 84 fastened on the shaft 80 by the fastening screw 86. The parts are illustrated in Figure 6 with the facing 46 withdrawn so that it will not make contact with the contact members 56 during movement of the spool in either direction. Upon rotating the actuating member 84 in a clockwise direction as viewed from the right of Figure 6, the gear 78 will travel down the threads on the screws 76, and the shoe 47 will travel in the same direction on the threads 44 because the threads 44 are lefthanded. Movement of the parts to the right is limited by the shoulder 88 in the shaft 80 which engages the head 90 of the screw 76, and movement in the opposite direction is limited by engagement between the annular land 92 on the bottom of the gear 78 with the adjacent surface of the head plate 12. I have illustrated a housing 94 encircling the shaft 80 where it passes through the head cap 26.

To make doubly sure that the inertia member will act promptly, I may provide it with an off center weight at 96.

I have illustrated means for holding the brake shoe and associated parts in any adjusted position. Referring to Figure 5, the leaf spring 98 has an irregularity 100 engaging the teeth of the gear 78. The strength of this leaf spring and the shape of the irregularity 100 are such that the leaf spring acts more powerfully than any turning force developed between the contact members 56 and the facing 46.

Referring now to Figure 8, the tail plate 102 and head plate 104 differ from those of Figure 1 primarily only in having deeper grooves at 106 to receive the edges of the end bells 108 of the spool. The brake shoe 110 is identical with the brake shoe 47 in its coaction with the inertia member, but it is a rigid part of the head plate 104 and not adjustable at all. The spool shaft at its right end 112 enters a non-adjustable bearing 114 provided with an oil inlet at 116, which bearing 114 has peripheral contact only and thus does not control the axial position of the spool. At the opposite end the spool shaft carries the usual click wheel 118 adapted to cooperate with the click 120, and its left end 122 enters the adjustable bearing 124 threaded in the tail plate 102. The bearing 124 has an annular groove 126 and the shaft end 122 carries a pin or split ring 128 turning in the groove 126. The bearing 124 also is provided with an oil inlet at 130. It will be apparent that adjustment of the bearing 124 will move the entire spool axially a few thousandths of an inch toward or away from the brake shoe 110, and thus accomplish the same adjustment of the operation of the automatic braking means as the adjustment means illustrated in Figure 6.

Referring now to Figures 9 to 12, inclusive, the head plate 132 is apertured at 134 to allow the adjustable brake means housed in the head cap 136 to extend through and contact the end bell 138. This adjustable braking means, in its entirety, is pivoted on a pivot 140 and may move from the position indicated in dotted lines at 142 in Figure 11 to the position indicated at 144. On account of the inclination of the adjacent flange of the end bell, the braking instrumentality will press much more firmly against the end bell in position 144 than in position 142.

The braking instrumentality illustrated comprises parallel supporting plates 146 and 148 on opposite sides of the wall of the head cap 136, which plates are pivoted on the pivot 140. The housing 150 has a flange 152 engaging the plate 148 and is held in assembled position with both plates by a split ring 154. Threaded in the housing 150 is a first sleeve 156 carrying a knurled head 158. Slidable in the sleeve 156 is a tubular brake shoe 160 urged to the left by the compression spring 162. A shoulder at 164 on the brake shoe 160 engages a lip 166 on the end of the sleeve 156 to limit outward movement, and a similar shoulder 168 may limit the inward movement. Between the shoulders 164 and 168 the brake shoe 160 has sliding movement guided by the sleeve 156 and the right end 170 also has sliding movement with contact on a smaller diameter. To prevent rotation of the brake shoe, its outer end portion at 172 is of non-circular cross section having, for instance, a groove 173, and slides in a non-circular opening in a housing 174 fastened to the plate 146 as by fastening screw 176. The facing of this brake is a leather plug 178 socketed in the end of the brake shoe 160 and projecting slightly beyond the end of the metallic portion of the shoe.

Referring now to Figures 13, 14, and 15, I have illustrated an inertia member mounted at the tail end of the spool. The tail plate 178 has right hand threads for threaded engagement with the combined bearing member and brake shoe 180, which may be adjusted by means of the knurled head 182. The spool shaft 184 carries the click wheel 186. The inertia member 188 is compelled to rotate by means of a wire yoke 190 passing through a transverse bore in the shaft end 192, in which bore the yoke 190 is fixed. In the position of Figure 14, which is the position the parts will occupy when the line is being reeled in, the inturned ends 194 of the yoke have moved clockwise in the slots 196 and 198, and the elongated opening at 200 in the inertia member 188 has permitted the inertia member to move downward as viewed in Figure 14 to such an extent that its brake engaging segment at 202 is not in engagement with the brake. Upon rotation of the spool shaft in a counterclockwise direction, the ends 194 will move to the opposite ends of the slots 196 and 198. This relative movement will cam the inertia member 188 over to the position of Figure 15 and advance the contact segment 202 into contact with the brake shoe. The brake shoe illustrated has an annular leather facing 204 laid in a suitable groove in the brake shoe proper and permanently fastened in place as by spinning in a bead at 206. It will be apparent that the arrangement of Figures 13 to 15, inclusive, is the full equivalent of that of Figure 1. Because the facing 204 has a conical contact surface, adjusting that surface to the right in Figure 13 will reduce the friction force when the line is running out and adjustment to the left will increase it. But in any position of adjustment within the limits of adjustment provided in the device, when the line is being reeled in the braking action will be zero, or less than when paying out, depending on the adjustment.

Referring now to Figure 16, in which diagram horizontal displacement represents adjustment, and vertical displacement represents the effective braking force, it will be noted that the line 207 representing the action when the line is running out, reaches zero values of force before the limit of adjustment is reached. In other words, the parts are so proportioned that by backing the brake shoe as far away as possible, a completely free spool is secured at all times, which amounts to rendering the braking device inoperative.

The force obtainable at the position indicated by the vertical dotted line 208, is about the maximum ever used for purposes of preventing backlash even with the heaviest plugs. Beyond that point, forces suitable for trolling are available. When trolling heavy lines for large fish, it is desirable to have a very light friction load on reeling in. Such a load can be unnoticeable when reeling in against the force of the lure or of a fish, but if a hooked fish suddenly swims toward the angler it is necessary to increase the speed of turning to prevent slack in the line. At such high speeds the inertia of the angler's hand becomes a critical factor, and a little muscular tenseness or trembling is likely to cause the angler to reverse the force on his hand before the hand passes dead center, thus reversing the movement of the reel momentarily. Not infrequently, an unnerved angler will tear his own fingers off the handle he is holding and hit them against the companion handle. Just a little drag at such a time materially assists the angler in avoiding both these undesirable manipulations.

Accordingly, I prefer to design the parts so that the friction face 46 can be moved far enough to cause friction to occur on reeling in, when the drag on reeling out is at or near its maximum value. The line 210 indicates the forces thus made available.

In the embodiments of Figures 1 to 8, and 13 to 15, the change in the rotational speed of the spool causes the inertia member to move up and exert its braking action. In the embodiment of Figures 9 to 12 rotation of the spool does not produce such a result. However, when a cast is made, the entire reel is swung through an arc centering somewhere near the shoulder or elbow of the angler, depending on the casting technique employed. The centrifugal force of this movement tends to throw the brake of Figures 9 to 12 into operative position, and the termination of the movement of the entire rod and reel when the line is released by the angler's thumb exerts an additional tendency in the same direction. With the device of Figures 9 to 12, the angler may achieve the same result as with the other devices, either by the forces just mentioned, or by moving the devices to the position 144 of Figure 11 just before casting.

In Figure 8 I have illustrated a spring member 127 having resilient lips 129 engaging the knurled head 124 to hold the parts in adjusted position.

Similarly in Figure 13 I have illustrated a plate 179 fixed on the shoe 180 having sockets 181 to receive the spring-pressed pin 183, whereby these parts are held in adjusted position.

Without further elaboration the foregoing will so fully explain my invention that others may, by applying knowledge current at the time of application, readily adapt the same for use under various conditions of service.

I claim:

1. In a fishing reel, in combination: a frame; a spool journaled on said frame; braking means including a braking instrumentality having an axis parallel to said spool; cam means rotating when said spool rotates, for shifting said instrumentality parallel to its own axis; a lost motion connection including said cam means and limiting the relative rotation of said cam means and said instrumentality; a stationary annular friction brake shoe positioned to be engaged by said instrumentality with varying degrees of force depending on the action of said cam means; said cam means being arranged to produce maximum friction when the line is being paid out and minimum friction when the line is being reeled in; and means for adjusting said brake shoe parallel to the axis of said instrumentality to vary the maximum and minimum friction automatically produced by said means; said adjustment means operating to move said shoe into positions where said cam means produces some friction in both directions, other positions where said cam means produces friction only when the line is running out, and other positions where said cam means produces no friction.

2. In a fishing reel in combination: a frame; a spool journaled on said frame; braking means including a braking instrumentality having an axis parallel to said spool; cam means rotating when said spool rotates, for shifting said instrumentality parallel to its own axis; a lost motion connection including said cam means and limiting the relative rotation of said cam means and said instrumentality; a stationary friction brake shoe positioned to be engaged by said instrumentality with varying degrees of force depending on the action of said cam means; said cam means being arranged to produce maximum friction when the line is being paid out and minimum friction when the line is being reeled in; and means for adjusting said brake shoe parallel to the axis of said instrumentality to vary the maximum and minimum friction automatically produced by said cam means; said adjustment means operating to move said shoe into positions where said cam means produces friction only when the line is running out, and other positions where said cam means produces no friction.

3. In a fishing reel in combination: a frame; a spool journaled on said frame; braking means including a braking instrumentality having an axis parallel to said spool; cam means rotating when said spool rotates, for shifting said instrumentality parallel to its own axis; a lost motion connection including said cam means and limiting the relative rotation of said cam means and said instrumentality; a stationary friction brake shoe positioned to be engaged by said instrumentality with varying degrees of force depending on the action of said cam means; said cam means being arranged to produce maximum friction when the line is being paid out and minimum friction when the line is being reeled in; and means for adjusting said brake shoe parallel to the axis of said instrumentality to vary the maximum and minimum friction automatically produced by said cam means.

4. In a fishing reel in combination: a frame; a spool journaled on said frame; braking means including a braking instrumentality having an axis parallel to said spool; cam means rotating when said spool rotates, for shifting said instrumentality; a lost motion connection including said cam means and limiting the relative rotation of said cam means and said instrumentality; a stationary friction brake shoe positioned to be engaged by said instrumentality with varying degrees of force depending on the action of said cam means; said cam means being arranged to produce maximum friction when the line is being paid out and minimum friction when the line is being reeled in; and means for adjusting said brake shoe parallel to the axis of said instrumentality to vary the maximum and minimum friction automatically produced by said cam means.

5. In a fishing reel, in combination: a frame; a spool journaled on said frame; braking means including a braking instrumentality having an axis parallel to said spool; cam means rotating when said spool rotates, for shifting said instrumentality perpendicular to its own axis; a lost motion connection including said cam means and limiting the relative rotation of said cam means and said instrumentality; a stationary friction brake shoe positioned to be engaged by said instrumentality with varying degrees of force depending on the action of said cam means; said cam means being arranged to produce maximum friction when the line is being paid out and minimum friction when the line is being reeled in; and means for adjusting said brake shoe parallel to the axis of said instrumentality to vary the maximum and minimum friction automatically produced by said cam means.

6. In a fishing reel, in combination: a frame; a spool journaled on said frame; an inertia member coaxial with said spool; a lost motion cam connection between said inertia member and spool permiting said inertia member to have limited helical movement with respect to said spool; a stationary brake shoe adjacent said inertia member; the sense of said helical movement being such that friction with said shoe holds said inertia member in rubbing position while the line is running out and automatically moves said inertia member out of rubbing position while the line is being reeled in; and means for adjusting the axial position of said spool to vary the forces automatically produced by said inertia member when thrown against said brake shoe.

7. In a fishing reel, in combination: a frame; a spool journaled on said frame; an inertia member coaxial with said spool; a lost motion connection between said inertia member and spool including a cam and permitting said inertia member to have limited helical movement with respect to said spool; a stationary brake shoe adjacent said inertia member; the sense of said helical movement being such that friction with said shoe holds said inertia member in rubbing position while the line is running out and automatically moves said inertia member out of rubbing position while the line is being reeled in; and means for adjusting the axial position of said cam to vary the forces automatically produced by said inertia member when thrown against said brake shoe.

8. In a fishing reel, in combination: a frame; a spool journaled on said frame; said spool having end bells and a shaft rotating with said spool and projecting beyond one of said end bells; an inertia member encircling said shaft beyond one of said bells; cam means on said shaft; a lost motion connection between said cam means and said inertia member, permitting said inertia member limited rotation with respect to said cam means and during said rotation shifting said inertia member parallel to its own axis; an annular brake shoe encircling said shaft and positioned to rub against said inertia member when said cam means moves said inertia member toward said shoe; said brake shoe being threadedly mounted on said frame; and adjustment means for rotating said shoe to change its position and the friction forces automatically generated by said inertia member and cam means; said friction forces operating to retain said inertia member in rubbing engagement when the line is running out.

9. In a fishing reel, in combination: a frame; a spool journaled on said frame; said spool having end bells; a shaft projecting beyond one of said end bells; an inertia member encircling said shaft beyond one of said bells; cam means rotating with said spool; a lost motion connection between said cam means and said inertia member, permitting said inertia member limited rotation with respect to said cam means and during said rotation shifting said inertia member parallel to its own axis; an annular brake shoe encircling said shaft and positioned to rub against said inertia member when said cam means moves said inertia member toward said shoe; said brake shoe being threadedly mounted on said frame; and adjustment means for rotating said shoe to change its position and the friction forces automatically generated by said inertia member and cam means; said friction forces operating to retain said inertia member in rubbing engagement when the line is running out.

10. In a fishing reel, in combination: a frame; a spool journaled on said frame; said spool having end bells and a shaft projecting beyond one of said end bells; an inertia member encircling said shaft beyond one of said bells; cam means on said shaft; a lost motion connection between said cam means and said inertia member, permitting said inertia member limited rotation with respect to said cam means and during said rotation shifting said inertia member parallel to its own axis; an annular brake shoe encircling said shaft and positioned to rub against said inertia member when said cam means moves said inertia member toward said shoe; said inertia member having a center of gravity offset from its axis of rotation.

11. In a fishing reel, in combination: a frame; a spool journaled on said frame; said spool having end bells and a shaft projecting in both directions beyond said end bells; an inertia member encircling said shaft beyond one of said bells; cam means on said shaft; a lost motion connection between said cam means and said inertia member, permitting said inertia member limited rotation with respect to said cam means and during said rotation shifting said inertia member parallel to its own axis; an annular brake shoe encircling said shaft and positioned to rub against said inertia member when said cam means moves said inertia member toward said shoe; said brake shoe being threadedly mounted on said frame; and adjustment means for rotating said shoe to change its position and the friction forces automatically generated by said inertia member and cam means; said cam means moving said member toward said shoe when the relative movement of the spool with respect to the inertia member is in the direction of paying out line.

12. In a fishing reel, in combination: a frame; a spool journaled on said frame; said spool having end bells and a shaft projecting at one end beyond the adjacent bell; a transverse pin in said shaft beyond said bell; a sleeve encircling said shaft beyond said pin; cam surfaces and stop shoulders on said sleeve for guiding said sleeve in a limited helical motion with respect to said pin and shaft; a member encircling said sleeve; connections between said member and sleeve preventing relative rotation but permitting a slight axial movement and a slight rocking movement; said member including resilient radial arms and a contact shoe at the outer end of each arm; an annular brake facing mounted in said frame and positioned to be engaged by said shoes; and adjustment means operating by dislacement of said facing for varying the friction forces automatically generated by said member.

13. In a fishing reel, in combination: a frame; a spool journaled on said frame; said spool having end bells and a shaft projecting at one end beyond the adjacent bell; a transverse pin in said shaft beyond said bell; a sleeve encircling said shaft beyond said pin; cam surfaces and stop shoulders on said sleeve for guiding said sleeve in a limited helical motion with respect to said pin and shaft; a member encircling said sleeve; connections between said member and sleeve preventing relative rotation but permitting a slight axial movement and a slight rocking movement; said member including resilient radial arms and a contact shoe at the outer end of each arm; an annular brake facing mounted in said frame and positioned to be engaged by said shoes; and adjustment means for varying the friction forces automatically generated by said member.

14. In a fishing reel, in combination: a frame; a spool journaled in said frame; said spool having end balls and a shaft projecting at one end beyond the adjacent bell; a transverse pin in said shaft beyond said bell; an inertia member encircling said shaft beyond said pin; cam surfaces and stop shoulders on said member for guiding said member in a limited helical motion with respect to said pin and shaft; said member including resilient radial arms and a contact shoe at the outer end of each arm; an annular brake facing mounted in said frame and positioned to be engaged by said shoes; and adjustment means operating by displacement of said facing for varying the friction forces automatically generated by said inertia member.

15. In a fishing reel, in combination: a frame; a spool journaled in said frame; said spool having end bells and a shaft projecting at one end beyond the adjacent bell; a sleeve encircling said shaft beyond said bell; cam surfaces and stop shoulders on said sleeve and shaft for guiding said sleeve in a limited helical motion with respect to said pin and shaft; a member encircling said sleeve; connections between said member and sleeve preventing relative rotation but permitting a slight axial movement and a slight rocking movement; said member including resilient radial arms and a contact shoe at the outer end of each arm; an annular brake facing mounted in said frame and positioned to be engaged by said shoes; and adjustment means operating by displacement of said facing for varying the friction forces automatically generated by said member.

16. In a fishing reel, in combination: a frame; a spool journaled on said frame; a brake shoe mounted on said frame for restraining rotation of said spool; and adjustment means for said shoe including a threaded means for supporting said shoe with respect to said frame; a transmission member threaded on said frame; gearing connecting said transmission member to said shoe; manual means for actuating said transmission member; said member and shoe moving in parallel paths in the same direction during adjustment in either direction; and stop means limiting the adjusting movement in both directions.

17. In a fishing reel, in combination: a frame; a spool journaled on said frame; a brake shoe mounted on said frame for restraining rotation of said spool; and adjustment means for said shoe including a threaded means for supporting said shoe with respect to said frame; a gear on said shoe; a transmission member threaded on said frame; a gear on said transmission member meshing with the gear on said shoe; manual means for actuating said transmission member; said member and shoe moving in parallel paths in the same direction during adjustment in either direction; and stop means limiting the adjusting movement in both directions.

18. In a fishing reel, in combination: a frame; a spool journaled on said frame; a brake shoe mounted on said frame for restraining rotation of said spool; and adjustment means for said shoe including a threaded means for supporting said shoe with respect to said frame; a gear on said shoe; a transmission member threaded on said frame; a gear on said transmission member meshing with the gear on said shoe; manual means for actuating said transmission member; said member and shoe moving in parallel paths in the same direction during adjustment in either direction; and stop means limiting the adjusting movement in both directions; said transmission member being threaded on said frame with right-handed thread; said shoe being mounted with lefthanded threads.

19. In a fishing reel, in combination: a frame; a spool journaled on said frame; a brake shoe mounted on said frame for restraining rotation of said spool; and adjustment means for said shoe including a threaded means for supporting said shoe with respect to said frame; a transmission member threaded on said frame; gearing connecting said transmission member to said shoe; manual means for actuating said transmission member; positive stop means limiting the adjusting movement in both directions; and resilient holding means engaging said gearing for holding the parts in any one of a plurality of intermediate positions of adjustment.

20. In a fishing reel, in combination: a frame; a spool journaled on said frame; a brake shoe mounted on said frame for restraining rotation of said spool; and adjustment means for said shoe including a threaded means for supporting said shoe with respect to said frame; a transmission member threaded on said frame; gearing connecting said transmission member to said shoe; manual means for actuating said transmission member; stop means limiting the adjusting movement in both directions; and resilient holding means for holding the parts in any one of a plurality of intermediate positions of adjustment.

JOHN V. SCHAFER.